(12) United States Patent
    Kwak (10) Patent No.:  US 8,265,051 B2
(45) Date of Patent:  \*Sep. 11, 2012

(54) METHOD AND APPARATUS FOR NETWORK MANAGEMENT USING PERIODIC MEASUREMENTS OF INDICATORS

(75) Inventor: Joseph A. Kwak, Hawkesbury (CA)

(73) Assignee: InterDigital Technology Corporation, Wilmington, DE (US)

( * ) Notice: Subject to any disclaimer, the term of this patent is extended or adjusted under 35 U.S.C. 154(b) by 61 days.

This patent is subject to a terminal disclaimer.

(21) Appl. No.: 12/763,360

(22) Filed: Apr. 20, 2010

(65) Prior Publication Data

US 2010/0202315 A1    Aug. 12, 2010

Related U.S. Application Data

(63) Continuation of application No. 10/845,822, filed on May 14, 2004, now Pat. No. 7,710,930.

(60) Provisional application No. 60/470,256, filed on May 14, 2003.

(51) Int. Cl.
    *H04W 4/00*        (2009.01)
(52) U.S. Cl. ........................ 370/338; 370/328
(58) Field of Classification Search .......... 370/328–344, 370/431–444, 430, 312
    See application file for complete search history.

(56) References Cited

U.S. PATENT DOCUMENTS

| 5,517,674 | A | 5/1996 | Rune |
| 5,815,811 | A | 9/1998 | Pinard et al. |
| 6,445,917 | B1 | 9/2002 | Bark et al. |
| 6,563,460 | B2 | 5/2003 | Stilp et al. |

(Continued)

FOREIGN PATENT DOCUMENTS

EP    1067812    1/2001

(Continued)

OTHER PUBLICATIONS

"Draft Supplement to Standard for Telecommunications and Information Exchange Between Systems—LAN/MAN Specific Requirements—Part 11: Wireless Medium Access Control (MAC) and physical layer (PHY) specifications: Specification for Radio Resource Measurement." IEEE Std 802.11k/D0.1, Mar. 2003.

(Continued)

*Primary Examiner* — Phuc Tran
(74) *Attorney, Agent, or Firm* — Volpe and Koenig, P.C.

(57) ABSTRACT

A beacon signal used in data communications, such as the IEEE 802.11, is provided with data extensions. The data extensions permit additional information to be provided by the beacon signal, thereby reducing the traffic overhead of the network. The data extensions further permit handoffs and handoffs based on offset values. Periodic beacon requests are made during connection between a wireless transmit/receive unit (WTRU) and an access point (AP) on a WLAN. A Measurement Request field corresponding to a beacon request contains a measurement duration value and channel number for which the request applies. The beacon request permits a scan mode which includes "Active Scan" mode, "Passive Scan" mode and "Beacon Table" mode. In Active Scan mode, the measuring station (STA) transmits a probe request with a broadcast SSID. In Passive Scan mode, the measuring STA passively receives on the specified channel and return a beacon report containing one information element for each STA from which it detects a beacon or probe response. In Beacon Table mode, the measuring STA returns a beacon report containing the current contents of its beacon table without performing additional measurements.

58 Claims, 3 Drawing Sheets

U.S. PATENT DOCUMENTS

| | | | |
|---|---|---|---|
| 6,636,738 | B1 | 10/2003 | Hayashi |
| 6,697,013 | B2 | 2/2004 | McFarland et al. |
| 6,771,934 | B2 | 8/2004 | Demers et al. |
| 6,865,609 | B1 | 3/2005 | Gubbi et al. |
| 6,873,611 | B2 | 3/2005 | Rios |
| 6,882,851 | B2 | 4/2005 | Sugar et al. |
| 6,958,982 | B2 | 10/2005 | Rudolf et al. |
| 6,985,465 | B2 | 1/2006 | Cervello et al. |
| 6,990,428 | B1 | 1/2006 | Kaiser et al. |
| 7,003,290 | B1 | 2/2006 | Salonaho et al. |
| 7,133,398 | B2 | 11/2006 | Allen et al. |
| 7,158,759 | B2* | 1/2007 | Hansen et al. ............. 455/67.11 |
| 7,710,930 | B2* | 5/2010 | Kwak ........................... 370/338 |
| 2002/0060995 | A1 | 5/2002 | Cervello et al. |
| 2002/0172186 | A1 | 11/2002 | Larsson |
| 2002/0188723 | A1 | 12/2002 | Choi et al. |
| 2003/0214905 | A1 | 11/2003 | Solomon et al. |
| 2003/0224797 | A1 | 12/2003 | Kuan et al. |
| 2004/0006705 | A1 | 1/2004 | Walker |
| 2004/0008627 | A1 | 1/2004 | Garg et al. |
| 2004/0039817 | A1 | 2/2004 | Lee et al. |
| 2004/0103278 | A1 | 5/2004 | Abhishek et al. |
| 2004/0120292 | A1 | 6/2004 | Trainin |
| 2004/0165563 | A1 | 8/2004 | Hsu et al. |
| 2004/0176024 | A1 | 9/2004 | Hsu et al. |
| 2004/0185845 | A1 | 9/2004 | Abhishek et al. |
| 2006/0013179 | A1 | 1/2006 | Yamane |
| 2006/0050742 | A1 | 3/2006 | Grandhi et al. |

FOREIGN PATENT DOCUMENTS

| | | |
|---|---|---|
| EP | 1257092 | 11/2002 |
| JP | 07-203517 | 8/1995 |
| WO | 98/29957 | 7/1998 |
| WO | 01/71981 | 9/2001 |
| WO | 02/093839 | 11/2002 |
| WO | 2004/100468 | 5/2004 |
| WO | 2006/097832 | 9/2006 |

OTHER PUBLICATIONS

"IEEE Wireless LAN Edition: A Compilation Based on IEEE Standard 802.11™—1999 (R2003) and its Amendments."

"Draft Supplement to Standard for Telecommunications and Information Exchange Between Systems—LAN/MAN Specific Requirements—Part 11: Wireless Medium Access Control (MAC) and phsical layers (PHY) specifications: Specification for Radio Resource Measurement." IEEE Std 802.11k/D0.1, Mar. 2003.

IEEE. "IEEE Std 802.11-1997 Information Technology—Telecommunications and Information Exchange Between Systems—Local and Metropolitan Area Networks—Specific Requirements—Part 11: Wireless LAN Medium Access Control (MAC) and Physical Layer (PHY) Specifications." IEEE Std. 802.11-1997. Jun. 26, 1997, pp. I-XIV, 1.

Universal Mobile Telecommunications Systems (UMTS); Radio Resource Control (RRC0 protocol specification (3GPP TS 25.331 version 5.4.0 Release 5), ETSI TS 125 331 V5.4.0 (Mar. 2003).

Kaaranan et al., "UMTS Networks: Architecture, Mobility and Services," pp. 6-13, 50-57, 71-99, and 181-207. (Jun. 2001).

"Draft Supplement to Standard for Telecommunications and Information Exchange Between Systems—LAN/MAN Specific Requirements—Part 11: Wireless Medium Access Control (MAC) and physical layer (PHY) specifications: Specification for Radio Resource Measurement." IEEE Std 801.11k/D0.1, Mar. 2003.

"Draft Supplement to Standard for Telecommunications and Information Exchange Between Systems—LAN/MAN Specific Requirements—Part 11: Wireless Medium Access Control (MAC) and physical layer (PHY) specifications: Specification for Radio Resource Measurement." IEEE Std 801.11k/D0.2, Mar. 2003.

"Draft Supplement to Standard for Telecommunications and Information Exchange Between Systems—LAN/MAN Specific Requirements—Part 11: Wireless Medium Access Control (MAC) and physical layer (PHY) specifications: Specification for Radio Resource Measurement." IEEE Std 802.11k/D0.2, May 2003.

"Draft Supplement to Standard for Telecommunications and Information Exchange Between Systems—LAN/MAN Specific Requirements—Part 11: Wireless Medium Access Control (MAC) and physical layer (PHY) specifications: Specification for Radio Resource Measurement." IEEE Std 802.11k/D0.1, Mar. 2003 .

"IEEE Wireless LAN Edition: A Compilation Based on IEEE Standard 802.11™ -1999 (R2003) and its Amendments."

Cervello, G. et al. "Dynamic Channel Selection (DCS) Scheme for 802.11." IEEE 802.11-00/195. Jul. 12, 2000, pp. 1-7.

Holma et al., "WCDMA for UMTS, The Radio Resource Control Protocol," John Wiley and Sons, pp. 135-151 (Jan. 2001).

IEEE. "IEEE Std 802.11-1997 Information Technology—Telecommunications and Information Exchange Between Systems—Local and Metropolitan Area Networks—Specific Requirements—Part 11: Wireless LAN Medium Access Control (MAC) and Physical Layer (PHY) Specifications." IEEE Std. 801.11-1997. Jun. 26, 1997, pp. I-XIV, 1.

Kaaranan et al., "UMTS Networks: Architecture, Mobility and Services," pp. 6-13, 50-57, 71-99, and 181-207, (Jun. 2001).

Moreton, Mike. "Comment Resolution Motions." Mar. 2003. IEEE 802.11-03/169r1.

Soomro et al., "Measurement/Quiet Request Element for DFS in Tgh," IEEE 802.11-02/215r0 (Mar. 2002).

Third Generation Partnership Project, "Technical Specification Group Radio Access Network; Radio Resource Control (RRC); Protocol Specification (Release 1999)," 3GPP TS 25.331 V3.18.0 (Mar. 2004).

Third Generation Partnership Project, "Technical Specification Group Radio Access Network; Radio Resource Control (RRC); Protocol Specification (Release 1999)," 3GPP TS 25.331 V3.14.0 (Mar. 2003).

Third Generation Partnership Project, "Technical Specification Group Radio Access Network; Radio Resource Control (RRC); Protocol Specification (Release 4)," 3GPP TS 25.331 V4.9.0 (Mar. 2003).

Third Generation Partnership Project, "Technical Specification Group Radio Access Network; Radio Resource Control (RRC); Protocol Specification (Release 4)," 3GPP TS 25.331 V4.13.0 (Mar. 2004).

Third Generation Partnership Project, "Technical Specification Group Radio Access Network; Radio Resource Control (RRC); Protocol Specification (Release 5)," 3GPP TS 25.331 V5.8.0 (Mar. 2004).

Third Generation Partnership Project, "Technical Specification Group Radio Access Network; Radio Resource Control (RRC); Protocol Specification (Release 6)," 3GPP TS 25.331 V6.1.0 (Mar. 2004).

Universal Mobile Telecommunications Systems (UMTS); Radio Resource Control (RRCO protocol specification (3GPP TS 25.331 version 5.4.0 Release 5), ETSI TS 125 331 V5.4.0 (Mar. 2003).

* cited by examiner

METHOD AND APPARATUS FOR NETWORK MANAGEMENT USING PERIODIC MEASUREMENTS OF INDICATORS

CROSS REFERENCE TO RELATED APPLICATION(S)

This application is a continuation of U.S. application Ser. No. 10/845,822 filed on May 14, 2004 now U.S. Pat. No. 7,710,930 which claims priority from U.S. Provisional Application No. 60/470,256 filed on May 14, 2003, which is hereby incorporated by reference.

FIELD OF INVENTION

This invention relates to beacon measurement request signals used in wireless slotted communications and network management. More particularly, the invention relates to network management using periodic measurements of parameters such as new beacon received power level or signal quality.

BACKGROUND

The IEEE 802.11 communications protocol allows a client to roam among multiple access points that may be operating on the same or separate channels. IEEE 802.11 communications are generally effected through wireless LAN access points (APs), which are typically single standalone units, but can include networks with multiple APs which provide a roaming function. To support the roaming function, each access point typically transmits a beacon signal every 100 ms. A roaming station (STA) uses the beacon to gauge the strength of its existing access point connection. If the STA senses a weak signal, the roaming STA can implement the reassociation service to connect to an access point emitting a stronger signal.

IEEE 802.11 supports two power modes; active and power-saving (PS). The protocols for infrastructure networks and ad hoc networks are different. Under an infrastructure network, there is an AP to monitor the mode of each mobile station. A station in the active mode is fully powered and thus may transmit and receive at any time. On the contrary, a station in the PS mode only wakes up periodically to check for possible incoming packets from the AP. A station always notifies its AP when changing modes. Periodically, the AP transmits beacon frames spaced by a fixed beacon interval. A PS station should monitor these frames. In each beacon frame, a traffic indication map (TIM) are delivered, which contains IDs of those PS stations with buffered unicast packets in the AP. A PS station, on hearing its ID, should stay awake for the remaining beacon interval. Under the contention period (i.e., DCF), an awake PS station can issue a PS-POLL to the AP to retrieve the buffered packets. While under the contention-free period (i.e., PCF), a PS station waits for the AP to poll it. The AP sends delivery TIMs (DTIMs) within beacon frames to indicate that there are buffered broadcast packets. The delivery TIMs are spaced by a fixed number of beacon intervals. Immediately after DTIMs, the buffered broadcast packets are sent.

Since IEEE 802.11 presumes that mobile stations are fully connected, the transmission of a beacon frame can be used to synchronize all stations' beacon intervals. In addition to the use in IEEE 802.11, beacon signals are useful in other WLAN communications and wireless communications in general. Periodic measurements are performed in systems implementing the third generation partnership program (3GPP) wideband code division multiple access (W-CDMA) system. Such systems use a time division duplex mode. To support higher layer functions in IEEE 802.11 standards for efficient network management, several physical parameters relating to different aspects of network management are desirable.

One such parameter is the perceived signal to noise indicator (PSNI), the measurement of which provides a quantized, comparative measure of received signal quality for all channels/rates and among all physical channels and between all stations. Another parameter is the received channel power indicator (RCPI) indicator, which is a measure of the received RF power in the selected channel, measured at the antenna connector. The RCPI parameter may be a measure by the PHY sub layer of the received RF power in the channel measured over the PLCP preamble and over the entire received frame. RCPI is a monotonically increasing, logarithmic function of the received power level defined in dBm. The exemplary allowed values for the RCPI parameter may be an 8-bit value in the range from 0 through 220.

In known approaches, the measurement of the parameters RCPI and PSNI is done as a single measurement, which approach has certain disadvantages. It is desirable to provide an improved method of making measurements of the parameters, e.g., RCPI and PSNI, to result in specific advantages resulting in more efficient network management.

SUMMARY

According to the present invention, periodic measurements of the new beacon request are used in order to support roaming and dynamic data rate adjustment, and related functions. The concepts for periodic measurements are performed in a manner analogous to periodic measurements in systems implementing third generation partnership program (3GPP) wideband code division multiple access (W-CDMA) system utilizing the time division duplex mode.

DETAILED DESCRIPTION OF THE PREFERRED EMBODIMENTS

Hereafter, a wireless transmit/receive unit (WTRU) includes but is not limited to a user equipment, mobile station, fixed or mobile subscriber unit, pager, or any other type of device capable of operating in a wireless environment. When referred to hereafter, an access point includes but is not limited to a Node B, site controller, access point or any other type of interfacing device in a wireless environment.

An "access point" (AP) in a typical IEEE 802.11 implementation is a station or device which provides wireless access for devices to establish a wireless connection with a LAN, and establishes a part of a wireless LAN (WLAN). If the AP is a fixed device on a WLAN, the AP is a station which transmits and receives data. The AP permits connection of a WTRU to a network, provided that the WLAN itself has a connection to the network.

Network management by making measurements of parameters, e.g., RCPI and PSNI, is performed periodically rather than in the manner of a one-time measurement. The impact of making periodic measurements on the network performance and the attendant benefits are addressed in the description of the preferred embodiment. More specifically, the beneficial effect of making periodic measurements on the beacon request extensions to support roaming and dynamic data rate are addressed. Even though the invention is described in the specific context of the standard IEEE 802.11 as an example, the invention is envisaged to be applicable to other scenarios also.

Periodic beacon requests are made during connection between a WTRU and an AP on a WLAN. A Measurement Request field corresponding to a beacon request contains a measurement duration value and channel number for which the request applies. The beacon request permits a scan mode which includes "Active Scan" mode, "Passive Scan" mode and "Beacon Table" mode. In Active Scan mode, the measuring station (STA) transmits a probe request with a broadcast service station identifier (SSID). The measuring STA's beacon report contains one information element for each STA from which it detects a beacon or probe response, regardless of whether the probe response was triggered by the measuring STA's own probe request. In Passive Scan mode, the measuring STA passively receives on the specified channel and returns a beacon report containing one information element for each STA from which it detects a beacon or probe response. If the measuring channel is also the serving channel, the STA concurrently carries out its normal data traffic operation. In Beacon Table mode, the measuring STA returns a Beacon Report containing the current contents of its beacon table without performing additional measurements. The Measurement Duration field is set equal to the duration of the requested measurement, expressed in time units (TUs).

The following are some potential advantages of periodic measurements as compared with the single measurement approach:

Periodic measurements reduce management traffic: single measurement request produces multiple reports but only when relevant.

Absolute Threshold crossings on PSNI measures are ideal to trigger data rate changes.

Absolute Threshold crossings on RCPI are ideal for proximity detectors for location.

Relative Threshold with respect to serving AP detects conditions for handoff.

The beacon request also contains periodic extensions (information fields) which specify periodic beacon measurements. The extensions fields are used to provide parameters for the periodic measurement and conditional reporting of measurement results. These provide periodic measurements which reduce management traffic, such that a single measurement request produces multiple reports. The multiple reports are provided only when deemed relevant. Absolute threshold crossings on perceived signal to noise indicator (PSNI) may be used as a condition to provide a measurement report. The measurements on PSNI are suitable to trigger data rate changes. Absolute threshold crossings on received channel power indicator (RCPI) may be used as a condition to provide a measurement report.

The periodic extensions are additional fields in the beacon request which are use for periodic beacon measurements. The capability to do periodic measurements is an optional capability for the AP, and therefore APs which are not capable of doing periodic beacon measurements will ignore the periodic extensions. A beacon request is a request to perform a measurement. A beacon report is the response containing the result(s) of the requested beacon measurement.

The absolute threshold crossings are suitable for proximity detectors used to determine location and approximate position relative to an AP. A relative threshold with respect to a serving AP is used to detect conditions for a handoff.

The measurement request field corresponding to a beacon request is shown in Table 1 and contains the measurement duration and channel number for which the request applies. Also included in Table 1 are the extensions (additional information fields) needed to specify periodic measurements and conditional reporting. Table 1 generally shows the measurement request field format for a beacon request. The illustration for the current measurement shows the number of octets for the channel number, channel band, measurement duration and scan mode. Table 1 also shows for comparison, the octets for periodic extensions, with respect to basic service set identifier (BSSID), measurement period, reporting condition, threshold/offset, and hysteresis effect. More particularly, the Measurement Request field corresponding to a beacon request is shown in Table 1 and contains the measurement duration and channel number for which the request applies. A response to a beacon request is a beacon report.

TABLE 1

| Beacon Request | | | | |
| --- | --- | --- | --- | --- |
| | Channel Number | Channel Band | Measurement Duration | Scan Mode |
| Octets: | 1 | 1 | 2 | 1 |
| | BSSID | Measurement Period | Reporting Condition | Threshold/ Offset | Hysteresis |
| Octets | 6 | 2 | 1 | 1 | 1 |

If the AP is not capable of performing periodic measurements and thus does not recognize the extensions, then the AP ignores the extensions and provides a single measurement and a single report.

In Table 1, channel number indicates the channel number on which the requesting STA instructs the receiving STA to report detected beacons and probe responses. In the beacon request, the Channel Number field indicates the channel number on which the requesting STA instructs the receiving STA to report detected beacons and probe responses. The Channel Band field indicates the frequency band, taken from Table 1, in which the receiving STA conducts its measurement. The Scan Mode field is set to the type of scan, according to Table 2 (infra). The scanning behavior is as follows:

In Active Scan mode, the measuring STA transmits a probe request with the broadcast SSID. The measuring STA's beacon report contains one information element for each STA from which it detects a beacon or probe response, regardless of whether the probe response was triggered by the measuring STA's own probe request.

In Passive Scan mode, the measuring STA passively receives on the specified channel and return a beacon report containing one information element for each STA from which it detects a beacon or probe response. If the measuring channel is also the serving channel, the STA concurrently carries out its normal data traffic operation.

In Beacon Table mode, the measuring STA returns a beacon report containing the current contents of its beacon table without performing additional measurements.

The Measurement Duration field is set equal to the duration of the requested measurement, expressed in TUs.

Tables 2 and 3 show channel band definitions for radio measurement requests and Scan Mode definitions for beacon request elements.

TABLE 2

Channel Band definitions for radio measurement requests

| Name | Channel Band |
|---|---|
| 2.4-GHz Band | 0 |
| 5-GHz Band | 1 |

TABLE 3

Scan Mode definitions for Beacon Request elements

| Name | Scan Mode |
|---|---|
| Passive Scan | 0 |
| Active Scan | 1 |
| Beacon Table | 2 |
| Reserved | 3-255 |

BSSID indicates the BSSID of the particular AP for which this measurement is requested. The BSSID specifies which AP to measure when several APs are detectable on a given channel. The BSSID is set to the broadcast BSSID when the measurement is performed on any AP(s) on this channel. A broadcast BSSID is used when an AP BSSID is unknown.

The Measurement Period indicates whether this measurement is a single measurement event or is a periodic measurement which is repeated each Measurement Period. The Measurement Period is divided into two subfields: Unit and Period. The Unit subfield defines the time unit for the Period subfield and consists of the 2 MSBs with the following values:

The Period subfield consists of the 14 LSBs and is an unsigned integer number representing the repeating time interval for this periodic measurement. A Period subfield value of 0 indicates that the measurement is not periodic but is a single measurement. A period subfield value of 16383 (3FFF Hex) indicates that the measurement is periodic with no requested measurement period; in this case the measurement is performed on a best effort basis and as frequently as conditions permit.

The Reporting Condition defines when the measured results are reported to the requesting STA. The Reporting Condition values are defined in Table 4.

TABLE 4

Reporting Condition Definitions for Beacon Request Element

| Condition Description | Reporting Condition |
|---|---|
| Report to be issued after each measurement. | 0 |
| Report to be issued when the RCPI level of the measured AP crosses above an absolute threshold with hysteresis. | 1 |
| Report to be issued when the RCPI level of the measured AP crosses below an absolute threshold with hysteresis. | 2 |
| Report to be issued when the PSNI level of the measured AP crosses above an absolute threshold with hysteresis. | 3 |
| Report to be issued when the PSNI level of the measured AP crosses below an absolute threshold with hysteresis. | 4 |

TABLE 4-continued

Reporting Condition Definitions for Beacon Request Element

| Condition Description | Reporting Condition |
|---|---|
| Report to be issued when the RCPI level of the measured AP crosses above a threshold defined by an offset (with hysteresis) from the serving AP's RCPI. | 5 |
| Report to be issued when the RCPI level of the measured AP crosses below a threshold defined by an offset (with hysteresis) from the serving AP's RCPI. | 6 |
| Report to be issued when the PSNI level of the measured AP crosses above a threshold defined by an offset (with hysteresis) from the serving AP's PSNI. | 7 |
| Report to be issued when the PSNI level of the measured AP crosses below a threshold defined by an offset (with hysteresis) from the serving AP's PSNI. | 8 |
| Periodic reports (one per measurement) to begin when the RCPI level of the measured AP enters and remains in a range bound by the serving AP's RCPI and an offset (with hysteresis) from the serving AP's RCPI. | 9 |
| Periodic reports (one per measurement) to begin when the PSNI level of the measured AP enters and remains in a range bound by the serving AP's PSNI and an offset (with hysteresis) from the serving AP's PSNI. | 10 |
| Reserved | 11-255 |

Threshold/Offset provides either the threshold value or the offset value to be used for conditional reporting. A threshold value is an unsigned 8 bit integer having units which are equivalent to PSNI or RCPI. An offset value is a signed 7 bit integer in the range of (−127, +127).

Hysteresis provides an unsigned 8 bit integer hysteresis value having units equivalent to the units used in the Threshold/Offset field.

Figure 1:
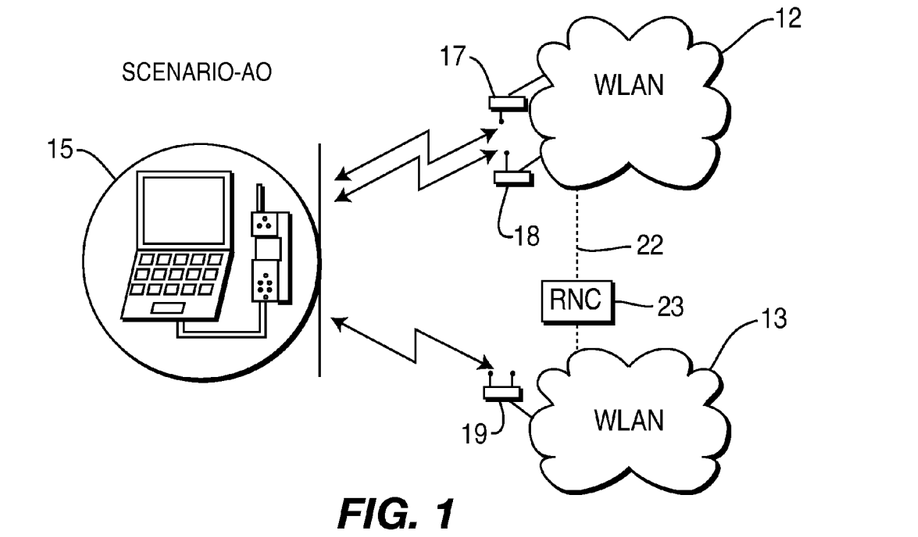
FIG. 1 is a schematic diagram of a network configuration in which WLANs communicate with a wireless transmit/receive unit (WTRU) through one or more access points.

FIG. 1 is a schematic diagram of a network configuration 11 in which one or more WLANs 12, 13 communicate with a WTRU 15 through one or more APs 17-19. In the example depicted the WLANs 12, 13 are able to establish a network link 22, either directly or through a radio network controller (RNC) 23.

Figure 2:
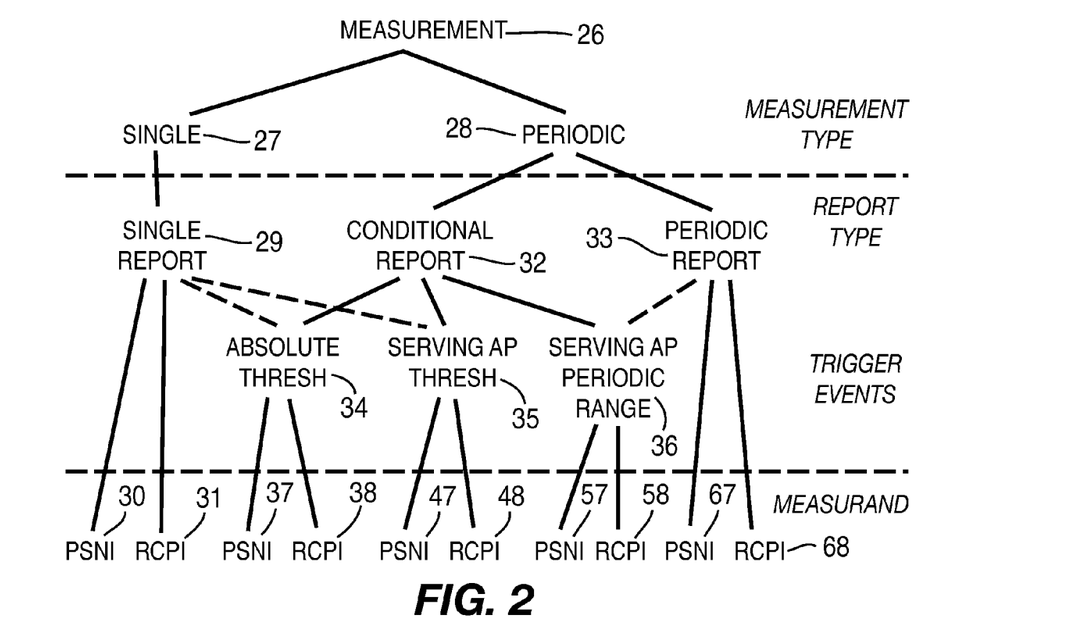
FIG. 2 is a chart showing types of measurements or reports.

FIG. 2 is a chart showing types of measurements or reports, showing how event detection triggers a report, or, triggers periodic reporting. More specifically, FIG. 2 illustrates for comparison, a single report scenario for PSNI and RCPI, as compared to similar periodic conditional reports for absolute threshold, serving AP threshold, serving AP periodic range. Also illustrated is the periodic reporting for each trigger event for comparison. The broadest category is a measurement 26. As used here, "measurement" can be a measurement or report. The measurement 26 may be a single 27 or periodic 28 measurement. A single measurement generates a single report 29, which includes a single report PSNI 30 and a single report RCPI 31. The periodic measurement 28 can generate a conditional report 32 or a periodic report 33. The conditional report 32 can provide an absolute threshold 34, a serving AP threshold 35 or a serving AP periodic range 36. The absolute threshold 34 includes an absolute threshold PSNI 37 and an absolute threshold RCPI 38. The serving AP threshold 35 includes a serving AP threshold PSNI 47 and a serving AP threshold RCPI 48. The serving AP periodic range 36 includes a serving AP periodic range PSNI 57 and a serving AP periodic range RCPI 58. The periodic report 33 includes a periodic report PSNI 67 and a periodic report RCPI 68.

In addition, the single report 31 may be conditionally reported based on an absolute threshold 34 including absolute threshold PSNI 37 and absolute threshold RCPI 38. Also, the single report 31 may be conditionally reported based on the serving AP threshold 35 including serving AP threshold PSNI 47 and serving AP threshold RCPI 48. The serving AP periodic range is not used for the single report 31, but may provide the serving AP periodic range 36 including serving AP periodic range PSNI 57 and serving AP periodic range RCPI 58 for periodic measurement reporting.

The single and periodic measurements 27, 28 are measurement types. The single report 31, conditional report 32, periodic report The absolute threshold 34, serving AP threshold 35 and serving AP periodic range 36 trigger events. The measurement results are the single report PSNI 27, single report RCPI 28, absolute threshold PSNI 37, absolute threshold RCPI 38, serving AP threshold PSNI 47, serving AP threshold RCPI 48, serving AP periodic range PSNI 57, serving AP periodic range RCPI 58, periodic report PSNI 67 and periodic report RCPI 68. For conditional reporting, event detection triggers one or more of these single event reporting outputs or periodical reporting outputs.

Figure 3:
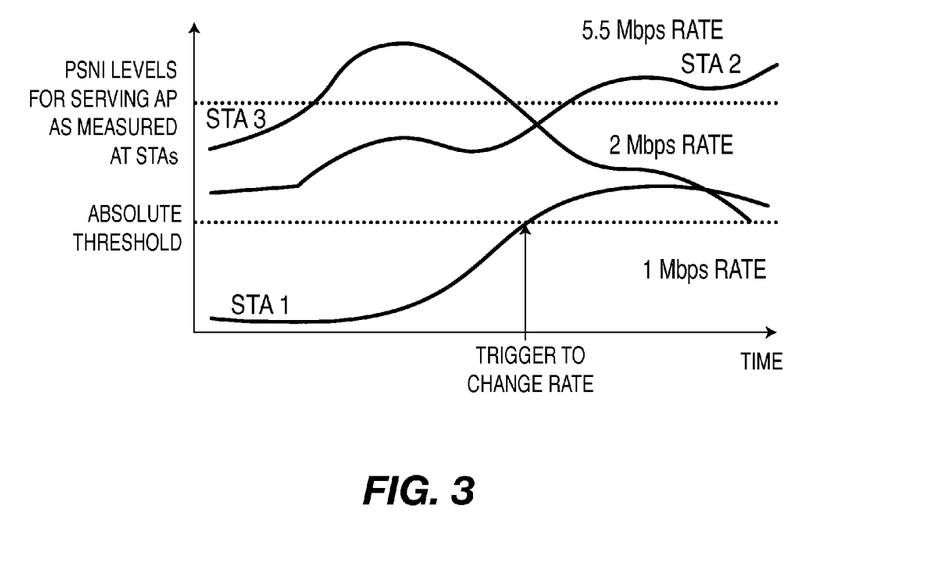
FIG. 3 is a graph showing the effects of absolute threshold on data rate selection.

FIG. 3 is a graph showing the effects of absolute threshold on data rate selection, and illustrates variation of measurement quantity against time for three different channels having 5.5 Mbps, 2.0 Mbps and 1.0 Mbps rates respectively. At an initial time of the graph, STA 1 receives a low PSNI level from the AP as measured at the STA, substantially below an absolute threshold. The rate is established at 1 Mbps. STA 2 and STA 3 have PSNI levels above the threshold level. As time progresses, STA 3 has received PSNI levels which exceed a second threshold and then drops down to below the absolute threshold. STA 3 thus can change to the 5.5 Mbps rate, but must drop down to the 2 Mbps rate and eventually the 1 Mbps rate as the PSNI level drops. STA 2 remains at the 2 Mbps rate until later, when STA 2 has sufficient PSNI levels to change to the 5.5 Mbps rate. These changes in PSNI levels can also be used to change APs by selecting the AP with a higher rate or PSNI level, should resources from that AP be available.

Figure 4:
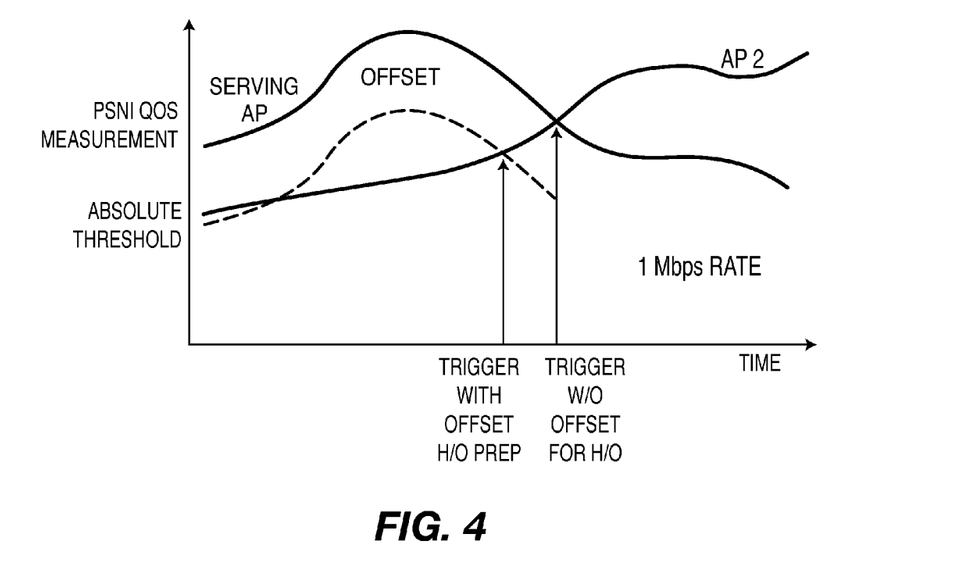
FIG. 4 is a graph showing a relative threshold which uses the serving AP for a handoff.

FIG. 4 is a graph showing a relative threshold which uses the serving AP for a handoff. This figure also illustrates variation of measurement quantity against time for AP 1 and AP 2 intersecting at a location showing the reporting event. The graph shows the signals received by a STA from a first AP (Serving AP) and a second AP (AP 2). The measurement for the servicing AP is made lower by an offset, in which PSNI is made lower, in order to favor AP 2. Thus the measurement of PSNI for the serving AP is made artificially lower by the offset. This causes an early trigger of the handoff as a result of the offset.

Figure 5:
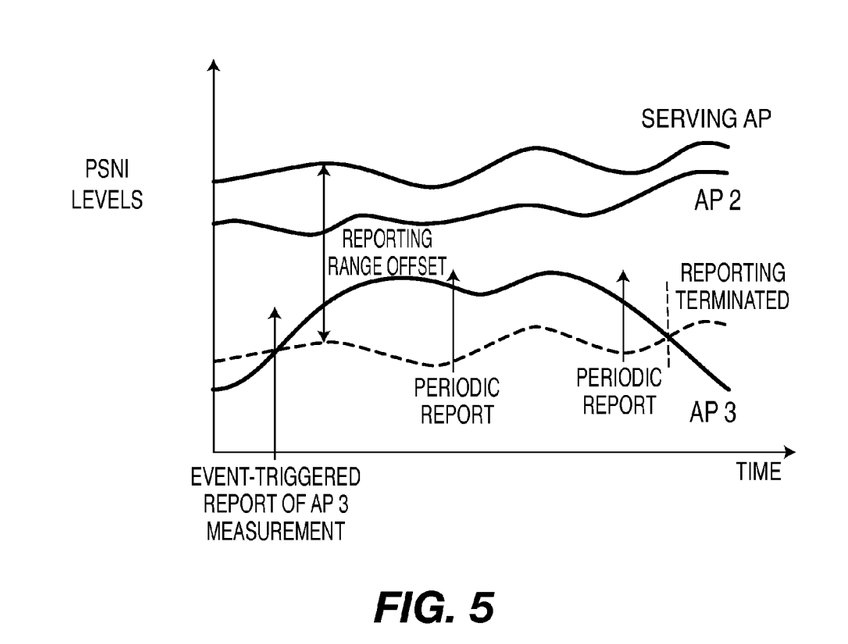
FIG. 5 is a graph showing the effect of a reporting offset.

FIG. 5 is a graph showing the effect of a reporting offset and shows relative threshold triggers for AP 1, 2 and 3 showing the reporting range and when the reporting terminates. The graph illustrates timeslot ISCP versus time showing the ISCP threshold and the reporting event. Event triggered and periodic reports of the PSNI levels each show the instance of a reduced PSNI level as a result of the offset. The reporting of the serving AP 3 continues during a peak period of PSNI reported from a third AP, AP 3, but discontinues when the signal from AP 3 drops below the offset reporting of PSNI from the serving AP.

Figure 6:
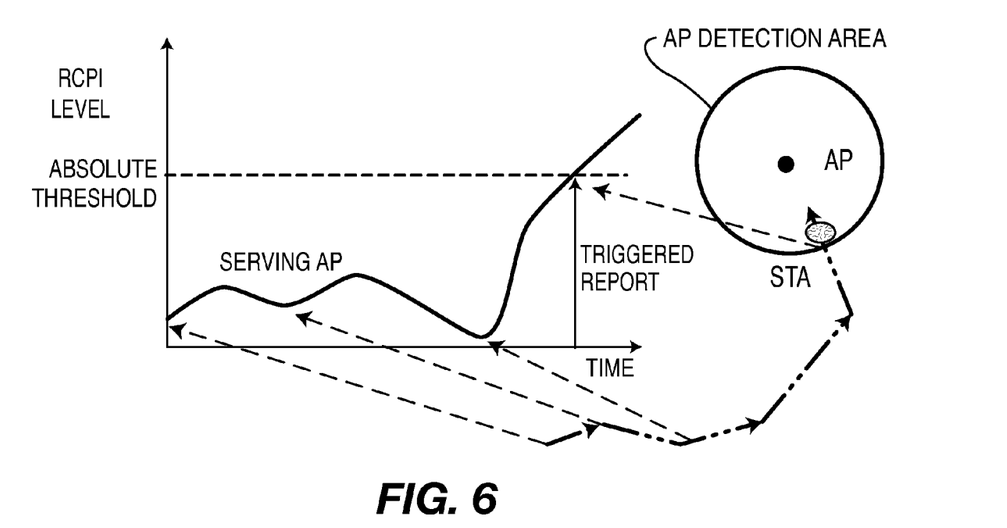
FIG. 6 is a graph showing the received channel power indicator (RCPI) level of a serving AP.

FIG. 6 is a graph showing the RCPI level of a serving AP. The triggering event here is an absolute threshold exceeded. The triggering event triggers a report.

Although the features and elements of the present invention are described in the preferred embodiments in particular combinations, each feature or element can be used alone (without the other features and elements of the preferred embodiments) or in various combinations with or without other features and elements of the present invention.

What is claimed is:

1. A method for use in a wireless transmit/receive unit (WTRU), the method comprising:
   receiving, from an access point (AP), a request to provide a beacon report, wherein the request comprises a mode field, a measurement duration field, a Basic Service Set Identifier (BSSID) field, a channel number field, and a reporting condition element representing a transmission condition for transmitting a beacon report; and
   transmitting, to the AP, the beacon report in response to satisfaction of the transmission condition.

2. The method of claim 1 wherein the reporting condition element is an 8 bit integer.

3. The method of claim 1, wherein the reporting condition element has a value of 0, and wherein the method further comprises:
   periodically performing a measurement; and
   transmitting the beacon report based on each periodically performed measurement.

4. The method of claim 1 wherein the reporting condition element has a value of 1, and wherein the method further comprises:
   transmitting the beacon report in response to a measured received channel power indicator (RCPI) value that is above a threshold.

5. The method of claim 1 wherein the reporting condition element has a value of 2, and wherein the method further comprises:
   transmitting the beacon report in response to a measured received channel power indicator (RCPI) value that is below a threshold.

6. The method of claim 1 wherein the reporting condition element has a value of 3, and wherein the method further comprises:
   transmitting the beacon report in response to a measured signal to noise indicator (SNI) value that is greater than a threshold.

7. The method of claim 1 wherein the reporting condition element has a value of 4, and wherein the method further comprises:
   transmitting the beacon report in response to a measured signal to noise indicator (SNI) value that is below an absolute threshold with hysteresis.

8. The method of claim 1 wherein the reporting condition element has a value of 5, and wherein the method further comprises:
   transmitting the beacon report in response to a measured received channel power indicator (RCPI) value that is above a threshold defined by an offset from a RCPI value of a serving access point (AP).

9. The method of claim 1 wherein the reporting condition element has a value of 6, and wherein the method further comprises:
   transmitting the beacon report in response to a measured received channel power indicator (RCPI) value that is below a threshold defined by an offset from an RCPI value of a serving access point (AP).

10. The method of claim 1 wherein the reporting condition element has a value of 7, and wherein the method further comprises:
    transmitting the beacon report in response to a measured signal to noise indicator (SNI) value that is above a threshold defined by an offset from an SNI value of a serving access point (AP).

11. The method of claim 1 wherein the reporting condition element has a value of 8, and wherein the method further comprises:

transmitting the beacon report in response to a measured signal to noise indicator (SNI) value that is below a threshold defined by an offset from an SNI value of a serving access point (AP).

12. The method of claim 1 wherein the reporting condition element has a value of 9, and wherein the method further comprises:
transmitting the beacon report periodically in response to a measured received channel power indicator (RCPI) value that is in a range bound by a RCPI value of a serving access point (AP) and an offset reference value.

13. The method of claim 1 wherein the reporting condition element has a value of 10, and wherein the method further comprises:
transmitting the beacon report periodically in response to a measured signal to noise indicator (SNI) value that is in a range bound by a SNI value of a serving access point (AP) and an offset reference value.

14. The method of claim 1, wherein the mode field indicates a passive scan mode, an active scan mode, or a beacon table mode.

15. A wireless transmit/receive unit (WTRU) comprising:
a receiver configured to receive, from an access point (AP), a request to provide a beacon report, wherein the request comprises a mode field, a measurement duration field, a Basic Service Set Identifier (BSSID) field, a channel number field, and a reporting condition element that represents a transmission condition for transmitting a beacon report; and
a transmitter configured to transmit the beacon report to the AP in response to satisfaction of the transmission condition.

16. The WTRU of claim 15 wherein the reporting condition element is an 8 bit integer.

17. The WTRU of claim 15 further comprising:
a measurement unit configured to perform a measurement, wherein the reporting condition element is 0 and the transmitter is further configured to transmit the beacon report based on each measurement.

18. The WTRU of claim 15 wherein the reporting condition element has a value of 1 and the transmitter is further configured to transmit the beacon report in response to a measured received channel power indicator (RCPI) value that is above a threshold.

19. The WTRU of claim 15 wherein the reporting condition element has a value of 2 and the transmitter is further configured to transmit the beacon report in response to a measured received channel power indicator (RCPI) value that is below a threshold.

20. The WTRU of claim 15 wherein the reporting condition element has a value of 3 and the transmitter is further configured to transmit the beacon report on a condition that a measured signal to noise indicator (SNI) value is greater than a threshold.

21. The WTRU of claim 15 wherein the reporting condition element has a value of 4 the transmitter is further configured to transmit and the beacon report in response to a measured signal to noise indicator (SNI) value that is below an absolute threshold with hysteresis.

22. The WTRU of claim 15 wherein the reporting condition element has a value of 5 the transmitter is further configured to transmit and the beacon report in response to a measured received channel power indicator (RCPI) value that is above a threshold defined by an offset from a RCPI value of a serving access point (AP).

23. The WTRU of claim 15 wherein the reporting condition element has a value of 6 and the transmitter is further configured to transmit and the beacon report in response to a measured received channel power indicator (RCPI) value that is below a threshold defined by an offset from an RCPI value of the a serving access point (AP).

24. The WTRU of claim 15 wherein the reporting condition element has a value of 7 and the transmitter is further configured to transmit the beacon report in response to a measured signal to noise indicator (SNI) value that is above a threshold defined by an offset from an SNI value of the a serving access point (AP).

25. The WTRU of claim 15 wherein the reporting condition element has a value of 8 and the transmitter is further configured to transmit the beacon report in response to a measured signal to noise indicator (SNI) value that is below a threshold defined by an offset from an SNI value of the a serving access point (AP).

26. The WTRU of claim 15 wherein the reporting condition element has a value of 9 and the transmitter is further configured to transmit the beacon report periodically in response to a measured received channel power indicator (RCPI) value that is in a range bound by a RCPI value of a serving access point (AP) and an offset reference value.

27. The WTRU of claim 15 wherein the reporting condition element has a value of 10 and the transmitter is further configured to transmit the beacon report-periodically in response to a measured signal to noise indicator (SNI) value that is in a range bound by a SNI value of a serving access point (AP) and a offset reference value.

28. The WTRU of claim 15, wherein the receiver is further configured to receive the mode field indicating a passive scan mode, an active scan mode, or a beacon table mode.

29. A method for use in an access point (AP), the method comprising:
transmitting, to a wireless transmit/receive unit (WTRU), a request to provide a beacon report, wherein the request comprises a mode field, a measurement duration field, a Basic Service Set Identifier (BSSID) field, a channel number field, and a reporting condition element representing a transmission condition for transmitting a beacon report; and
receiving, from the WTRU, the beacon report in response to satisfaction of the transmission condition.

30. The method of claim 29, wherein the mode field indicates a passive scan mode, an active scan mode, or a beacon table mode.

31. The method of claim 29 wherein the reporting condition element is an 8 bit integer.

32. The method of claim 29, wherein the reporting condition element has a value of 0, and wherein the method further comprises:
receiving the beacon report based on a periodically performed measurement.

33. The method of claim 29 wherein the reporting condition element has a value of 1, and wherein the method further comprises:
receiving the beacon report in response to a measured received channel power indicator (RCPI) value that is above a threshold.

34. The method of claim 29 wherein the reporting condition element has a value of 2, and wherein the method further comprises:
receiving the beacon report in response to a measured received channel power indicator (RCPI) value that is below a threshold.

35. The method of claim 29 wherein the reporting condition element has a value of 3, and wherein the method further comprises:
receiving the beacon report in response to a measured signal to noise indicator (SNI) value that is greater than a threshold.

36. The method of claim 29 wherein the reporting condition element has a value of 4, and wherein the method further comprises:
receiving the beacon report in response to a measured signal to noise indicator (SNI) value that is below an absolute threshold with hysteresis.

37. The method of claim 29 wherein the reporting condition element has a value of 5, and wherein the method further comprises:
receiving the beacon report in response to a measured received channel power indicator (RCPI) value that is above a threshold defined by an offset from a RCPI value of a serving AP.

38. The method of claim 29 wherein the reporting condition element has a value of 6, and wherein the method further comprises:
receiving the beacon report in response to a measured received channel power indicator (RCPI) value that is below a threshold defined by an offset from an RCPI value of a serving AP.

39. The method of claim 29 wherein the reporting condition element has a value of 7, and wherein the method further comprises:
receiving the beacon report in response to a measured signal to noise indicator (SNI) value that is above a threshold defined by an offset from an SNI value of a serving AP.

40. The method of claim 29 wherein the reporting condition element has a value of 8, and wherein the method further comprises:
receiving the beacon report in response to a measured signal to noise indicator (SNI) value that is below a threshold defined by an offset from an SNI value of a serving AP.

41. The method of claim 29 wherein the reporting condition element has a value of 9, and wherein the method further comprises:
receiving the beacon report periodically in response to a measured received channel power indicator (RCPI) value that is in a range bound by an RCPI value of a serving AP and an offset reference value.

42. The method of claim 29 wherein the reporting condition element has a value of 10, and wherein the method further comprises:
receiving the beacon report periodically in response to a measured signal to noise indicator (SNI) value that is in a range bound by a SNI value of a serving AP and an offset reference value.

43. An access point (AP) comprising:
a transmitter configured to transmit, to a wireless transmit/receive unit (WTRU), a request to provide a beacon report, wherein the request comprises a mode field, a measurement duration field, a Basic Service Set Identifier (BSSID) field, a channel number field, and a reporting condition element that represents a transmission condition for transmitting a beacon report; and
a receiver configured to receive, from the WTRU, the beacon report in response to satisfaction of the transmission condition.

44. The AP of claim 43, wherein the transmitter is further configured to transmit the mode field indicating a passive scan mode, an active scan mode, or a beacon table mode.

45. The AP of claim 43 wherein the reporting condition element is an 8 bit integer.

46. The AP of claim 43, wherein the reporting condition element is 0 and the receiver is further configured to receive the beacon report based on a measurement.

47. The AP of claim 43 wherein the reporting condition element has a value of 1 and the receiver is further configured to receive the beacon report in response to a measured received channel power indicator (RCPI) value that is above a threshold.

48. The AP of claim 43 wherein the reporting condition element has a value of 2 and the receiver is further configured to receive the beacon report in response to a measured received channel power indicator (RCPI) value that is below a threshold.

49. The AP of claim 43 wherein the reporting condition element has a value of 3 and the receiver is further configured to receive the beacon report on a condition that a measured signal to noise indicator (SNI) value is greater than a threshold.

50. The AP of claim 43 wherein the reporting condition element has a value of 4 the receiver is further configured to receive and the beacon report in response to a measured signal to noise indicator (SNI) value that is below an absolute threshold with hysteresis.

51. The AP of claim 43 wherein the reporting condition element has a value of 5 the receiver is further configured to receive and the beacon report in response to a measured received channel power indicator (RCPI) value that is above a threshold defined by an offset from a RCPI value of a serving AP.

52. The AP of claim 43 wherein the reporting condition element has a value of 6 and the receiver is further configured to receive the beacon report in response to a measured received channel power indicator (RCPI) value that is below a threshold defined by an offset from an RCPI value of the a serving AP.

53. The AP of claim 43 wherein the reporting condition element has a value of 7 and the receiver is further configured to receive the beacon report in response to a measured signal to noise indicator (SNI) value that is above a threshold defined by an offset from an SNI value of the a serving AP.

54. The AP of claim 43 wherein the reporting condition element has a value of 8 and the receiver is further configured to receive the beacon report in response to a measured signal to noise indicator (SNI) value that is below a threshold defined by an offset from an SNI value of the a serving AP.

55. The AP of claim 43 wherein the reporting condition element has a value of 9 and the receiver is further configured to receive the beacon report periodically in response to a measured received channel power indicator (RCPI) value that is in a range bound by a RCPI value of a serving AP and an offset reference value.

56. The AP of claim 45 wherein the reporting condition element has a value of 9 and the receiver is further configured to receive the beacon report periodically in response to a measured received channel power indicator (RCPI) value that is in a range bound by a RCPI value of a serving AP and an offset reference value.

57. A wireless communications system comprising:
a first station (STA) configured to transmit a request to provide a beacon report, wherein the request comprises a mode field, a measurement duration field, a Basic Service Set Identifier (BSSID) field, a channel number field, and a reporting condition element that represents a transmission condition for transmitting a beacon report; and
a second STA configured to receive the request, wherein on a condition that the second STA does not recognize the reporting condition element, the second STA is further configured to transmit the beacon report to the first STA in response to performing a measurement.

58. The wireless communications system of claim 57, wherein the first STA is an access point (AP).

* * * * *